Figure 1:
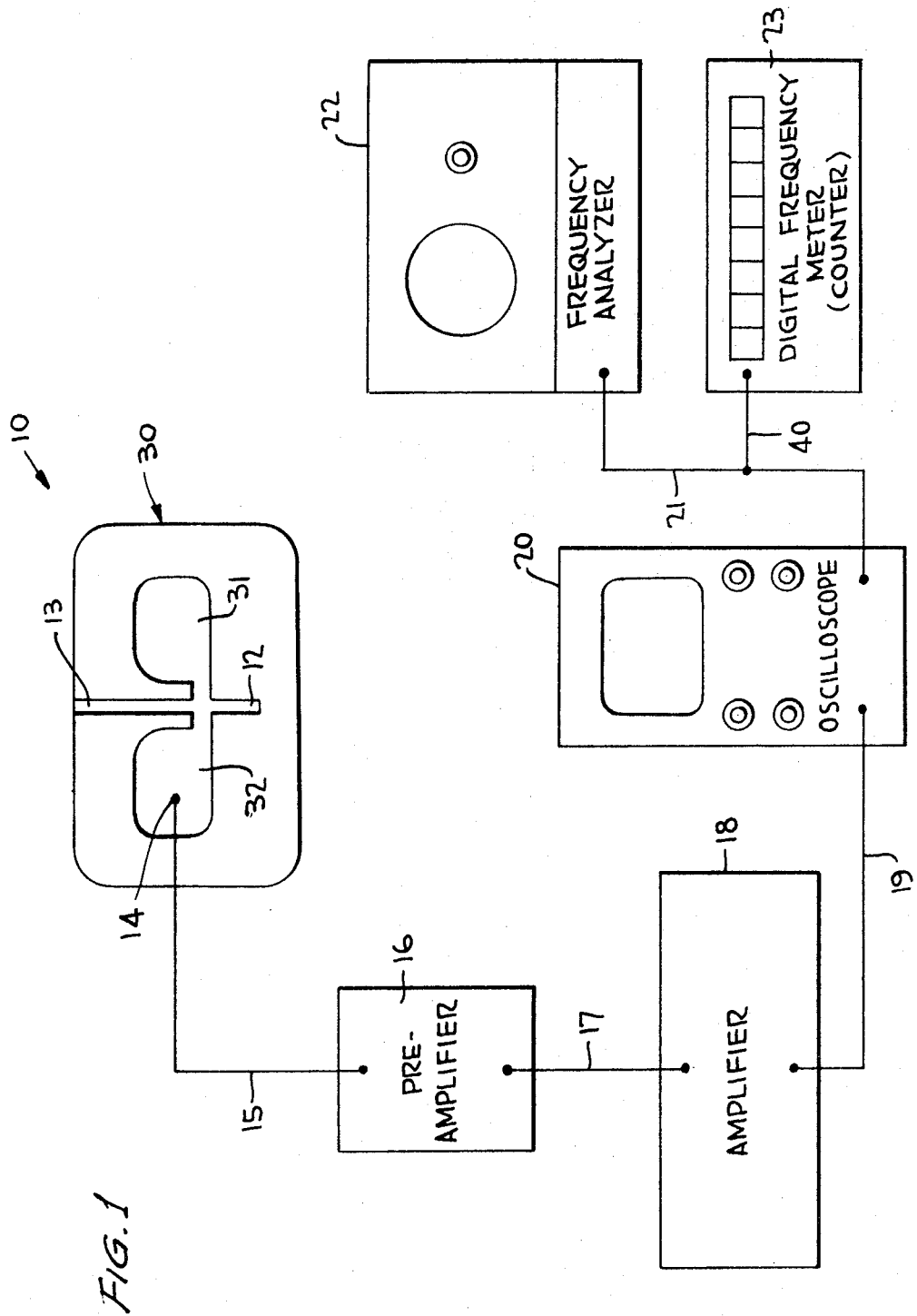

United States Patent
Vondell

[15] 3,667,297
[45] June 6, 1972

[54] FLUERIC TEMPERATURE SENSOR

[72] Inventor: Carter Vondell, Vienna, Va.

[73] Assignee: The United States of America as represented by the Secretary of the Army

[22] Filed: May 21, 1969

[21] Appl. No.: 831,813

Related U.S. Application Data

[63] Continuation of Ser. No. 629,867, Apr. 5, 1967, abandoned.

[52] U.S. Cl. ...................................73/339 A, 73/357, 137/81.5
[51] Int. Cl. ...........................................................B21d 28/00
[58] Field of Search ....................137/81.5; 73/339, 346, 349, 73/357, 339 A

[56] References Cited

UNITED STATES PATENTS

| | | | |
|---|---|---|---|
| 2,582,232 | 1/1952 | Cesaro et al. | 73/339 |
| 3,214,976 | 11/1965 | Miller, Jr. | 73/339 |
| 3,321,955 | 5/1967 | Hatch, Jr. | 137/81.5 |
| 3,432,804 | 3/1969 | Beeken | 137/81.5 |
| 3,451,269 | 6/1969 | Johnson | 73/339 |

*Primary Examiner*—Samuel Feinberg
*Attorney*—Harry M. Saragovitz, Edward J. Kelly, Herbert Berl and Peter T. Corbin

[57] ABSTRACT

A pressure insensitive, temperature dependent fluid oscillator has a fluid supplied thereto. The frequency of the oscillator is measured indicating the temperature of the fluid. The frequency of the oscillator is made independent of pressure fluctuations by having a choked flow condition exist with regard to the discharge nozzle of the oscillator.

12 Claims, 6 Drawing Figures

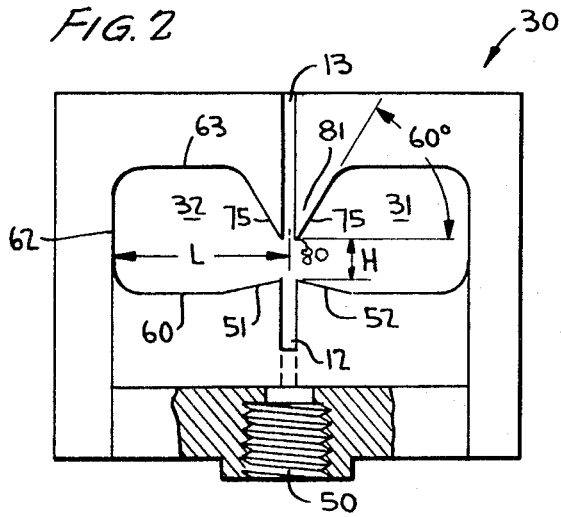
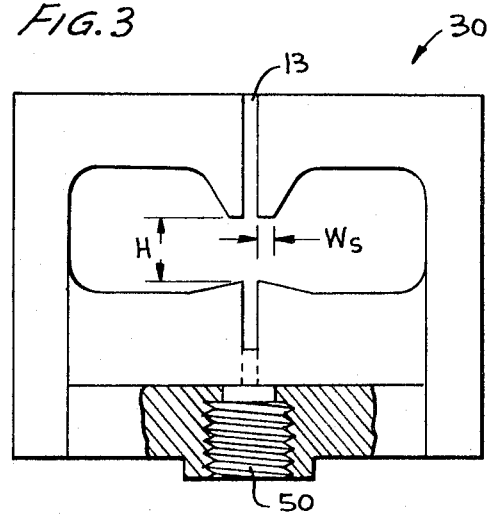
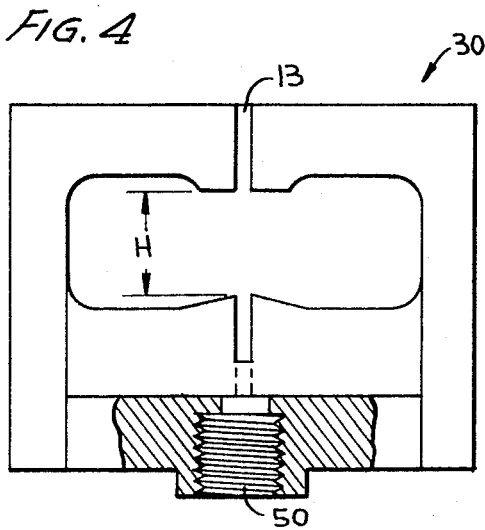
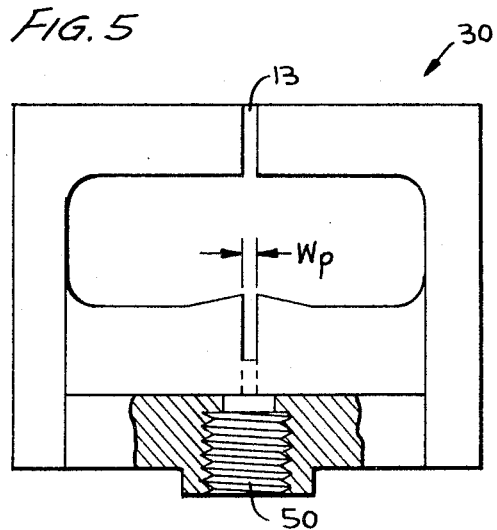
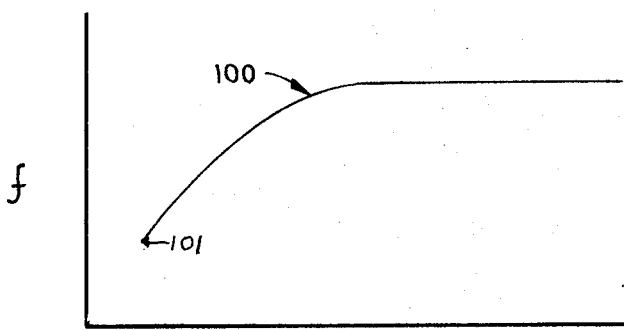

FLUERIC TEMPERATURE SENSOR

This application is a continuation of Ser. No. 629,867 filed Apr. 5, 1967, now abandoned.

This invention relates to a temperature measuring device and in particular to a no-moving-part temperature sensor capable of sustained operation in extremely high temperature environments.

Recently, Richard Gottron and Wilmer Gaylord (hereinafter referred to as Gottron et al.) developed a flueric thermometer which is the subject matter of U.S. Pat. application Ser. No. 268,497 filed Mar. 27, 1963. Prior to the Gottron et al. flueric thermometer slow response times in thermometers were a great problem. The time lag in many control situations was great enough to render the use of prior art thermometers of little value. Prior art thermometers were also fragile, limited in their temperature ranges, sensitive to vibrations and nuclear radiation while being expensive to make. The Gottron et al. flueric thermometer was a great breakthrough in the temperature measuring arts as it eliminated most of the above mentioned difficulties. The Gottron et al. device measures the frequency of a fluid oscillator and since the oscillator frequency is a function of temperature alone, indirectly measures temperature. While the Gottron et al. thermometer was a great advance in the art it has been found that sustained operation at high temperatures was impossible because of the erosive effect of the fluid being measured on the flueric oscillator. Similarly, while the flueric temperature sensor of Gottron et al. is an extremely effective temperature measuring device it utilized a stilling chamber in communication with the oscillator discharge region to render the oscillator frequency insensitive to pressure changes eliminating an amount of desired compactness.

It is therefore an object of this invention to provide an improved flueric temperature sensor.

Another object of the present invention is to provide a flueric temperature sensor with means to withstand sustained high temperature ranges with a minimum amount of erosion.

Still a further object of the present invention is to provide a flueric oscillator with means to eliminate frequency changes due to pressure variation that are compact and yet efficient.

Briefly, in accordance with the present invention, a flueric oscillator is provided with an inlet nozzle having a throat region of constant cross-sectional area and a discharge nozzle of a smaller constant cross-sectional area than said throat. The nozzle area ratio allows a choked flow condition which maintains the oscillator frequency sensitive to the temperature of the test fluid but renders the oscillator frequency insensitive to pressure variations of the test fluid. The frequency of the oscillator is measured giving an indication of the temperature of the fluid it receives.

Other objects and aspects of the present invention will be apparent from the following description and drawings wherein:

FIG. 1 is a schematic representation of a flueric temperature sensor and its detecting circuit in accordance with the present invention, FIG. 2 is a schematic representation of an embodiment of a flueric oscillator in accordance with the present invention, FIG. 3 is a schematic representation of a second embodiment of a flueric oscillator in accordance with the present invention, FIG. 4 is a schematic representation of a third embodiment of a flueric oscillator in accordance with the present invention, FIG. 5 is a schematic representation of a fourth embodiment of a flueric oscillator in accordance with the present invention, and FIG. 6 is a plot of frequency vs pressure for the flueric oscillators of my invention.

In FIG. 1 a temperature measuring system 10 is shown including a flueric oscillator 30. Flueric oscillator 30 includes an inlet nozzle having a throat 12 which receives the test fluid and a discharge nozzle 13 for discharging the same. A pair of oppositely disposed symmetrically placed cavities 31 and 32 are on either side of the fluid passing from inlet nozzle 12 to discharge nozzle 13. A fluid pulse to electric signal transducer 14 is placed in cavity 32 and by a line 15 is connected to a preamplifier 16 which by a line 17 is connected to an electrical amplifier 18. A line 19 connects amplifier 18 with an oscilloscope 20. A line 21 connects a frequency analyzer 22 with oscilloscope 20 while a line 40 connects a digital frequency meter (counter) 23 with oscilloscope 20.

In FIG. 2 a flueric oscillator 30 is shown with a threaded test fluid inlet nozzle 50 having a throat region 12, the latter of constant cross-sectional area. Directly opposite throat region 12 is a discharge nozzle 13 of smaller cross-sectional area than throat region 12 and also of constant cross-sectional area. It has been determined that by making the inlet nozzle and discharge nozzle of constant cross-sectional area that larger signal amplitudes may be obtained. Cavities 32 and 31 are on either side of both throat 12 and discharge nozzle 13. Throat 12 is formed by a slanted section 51 which is integral with a straight section 60 which in turn is perpendicular to a sidewall 62. A section 63 is parallel to section 60 and integral with sidewall 62. A slanted portion 75 is joined to section 63 defining splitter 81 and terminates in a point 80 helping to define discharge nozzle 13. Slanted section 75 is shown at an angle of 60° measured with a horizontal datum, but could obviously be changed without departing from the scope of invention. Cavity 31 is identical to cavity 32 so a description of the former is not necessary. Referring momentarily to FIGS. 3 and 5, Ws denotes the width of splitter 81 while Wp denotes the width of the inlet throat. As can be seen in FIG. 2, Ws/Wp=0 for this configuration. By having the inlet throat of a larger cross-sectional area than discharge nozzle 13 the frequency of oscillator 30 can retain temperature sensitivity while being pressure insensitive as seen in FIG. 6. FIG. 6 shows a flueric oscillator plot of frequency VS inlet pressure and for a sufficiently high pressure (100) a choked condition will occur which will result in an oscillator whose frequency is pressure independent. The theory behind the operation of oscillator 30 is not difficult to understand. As a fluid jet issues from inlet nozzle 12 it is subjected to an oscillation transversely to the jet issuing direction. This oscillation has traditionally been called edgetone oscillation. The edgetone oscillation is caused by inherent instabilities, high shear rates, vortex shedding and feedback characteristics of the jet-edge flow configuration and is dependent upon the jet velocity and distance H as shown in FIG. 2. The cavity in which the fluid transverses from the inlet nozzle to the discharge nozzle has a characteristic or resonant frequency (eigen frequency). This cavity eigen frequency is excited by the edgetone oscillations beginning at an input pressure corresponding to the threshold point 101 shown in FIG. 6.

The overall frequency of the oscillator can be represented as follows:

$$f = \sqrt{\gamma RT/4L} \quad (1)$$

where
 $\gamma$ = a gas constant
 $R$ = a gas constant
 $L$ = the cavity length
 $T$ = the temperature and
 $f$ = the frequency of the oscillator As can be seen from equation (1) the oscillation of the fluid in the cavity is a function solely of the temperature of the test fluid. As can be seen in FIG. 1 the transducer in cavity 31 converts the fluid oscillations in cavity 31 to an electrical signal which by line 15 goes to a preamplifier 16 which amplifies the signal. A line 17 transfers the amplified signal to an amplifier 18 which also amplifies the signal. A line 19 transfers the amplified signal to an oscilliscope 20 which by a line 21 and a line 40 is connected to a frequency analyzer 22 and a counter 23 which measures the frequency and indirectly the temperature.

In FIG. 2 the splitter thickness Ws is essentially 0 giving a Ws/Wp ratio of 0. In FIG. 3 part of the splitter closest to inlet throat 12 has been removed to give a Ws/Wp ratio of 1.5 while in FIG. 4 more of the splitter has been removed to give a Ws/Wp ratio of 3. The flueric oscillators of FIGS. 3 and 4 operate identically to the flueric oscillator of FIG. 2 but because of the increased splitter thickness of the oscillators of FIGS. 3 and 4, the latter have been found to be superior to the oscillator of FIG. 2 in resisting erosion. The flueric oscillator of FIG. 5 is identical in operation to the other oscillators disclosed but has its splitter entirely removed resulting in a Ws/Wp ratio of infinity (∞) since the splitter is as large as the wall containing the discharge nozzle. The flueric oscillator of FIG. 5 has been found to be the most superior of the oscillators disclosed for resisting erosion around the discharge nozzle.

It can thus be seen I have disclosed a novel and simple means to measure temperature of a test fluid that is compact and erosion resistant.

It will be apparent that the embodiments shown are only exemplary and that various modifications can be made in construction and arrangement within the scope of the invention as defined in the appended claims.

I claim:

1. A flueric oscillator the frequency of which is a function of temperature, comprising:
    a. an inlet nozzle to receive power fluid;
    b. a discharge nozzle centrally located within a splitter and in axial alignment with and separated from said inlet nozzle to receive the power fluid issuing from said inlet nozzle;
    c. first and second resonant cavities having equal dimensions and being closed to atmosphere;
    d. first and second openings located along said splitter which separates said first and second resonant cavities, said openings facing each other and located along each side of the fluid path between said inlet nozzle and said discharge nozzle; said splitter having a blunt end portion facing said inlet nozzle for partially deflecting power fluid into each of said resonant cavities; and
    e. transducer means adjacent at least one of said resonant cavities for producing electrical signals in response to fluid oscillations; whereby the temperature of said power fluid is determined as a function of the frequency of oscillations in said cavity.

2. The oscillator of claim 1 wherein the end portion of said splitter has a thickness $W_s$ and said inlet nozzle has a diameter $W_p$, and the ratio of $W_s$ to $W_p$ is between zero and infinity.

3. The oscillator of claim 1 wherein said first and second openings have a vertical dimension H as measured between said inlet and discharge nozzles, and said dimension H is equal to or less than the vertical dimension of said resonant cavities.

4. The oscillator of claim 1 further comprising means to amplify said electrical signals, and means for producing an output signal indicative of the temperature of said power fluid.

5. The oscillator of claim 4 wherein said means for producing an output signal comprises a digital counter.

6. The oscillator of claim 5 further comprising a frequency analyzer.

7. The oscillator of claim 6 further comprising an oscilloscope.

8. A temperature sensitive apparatus comprising
    a. an inlet nozzle having a throat region of constant cross-sectional area for transmitting a power fluid having a predetermined minimum pressure;
    b. a discharge nozzle in axial alignment with said inlet nozzle and having a constant cross sectional area;
    c. the ratio of discharge nozzle area to inlet nozzle area being selected to produce a condition of choked flow for the predetermined fluid pressure in said inlet nozzle;
    d. a resonant cavity closed to atmosphere and located between said inlet nozzle and said discharge nozzle; and
    e. means for measuring the frequency of fluid oscillations within said resonant cavity.

9. The apparatus of claim 8 wherein the axis of said inlet nozzle and said discharge nozzle divides said resonant cavity into a pair of oppositely disposed symmetrical cavity sections.

10. The apparatus of claim 9 wherein the power fluid issuing from said inlet nozzle impinges on the edge of said discharge nozzle to produce edgetone oscillation.

11. The apparatus of claim 10 wherein said discharge nozzle extends into said resonant cavity to constitute a splitter.

12. The apparatus of claim 11 wherein the edge of said splitter is blunt.

* * * * *

UNITED STATES PATENT OFFICE
CERTIFICATE OF CORRECTION

Patent No. 3,667,297　　　　　　　Dated June 6, 1972

Inventor(s) Vondell Carter

It is certified that error appears in the above-identified patent and that said Letters Patent are hereby corrected as shown below:

On the cover sheet [72] the inventor's name should read -- Vondell Carter --.

Signed and sealed this 7th day of November 1972.

(SEAL)
Attest:

EDWARD M. FLETCHER, JR.　　　　　ROBERT GOTTSCHALK
Attesting Officer　　　　　　　　Commissioner of Patents